United States Patent
Mahimkar et al.

(10) Patent No.: US 11,212,710 B1
(45) Date of Patent: Dec. 28, 2021

(54) ZERO TOUCH CELLULAR CARRIER CONFIGURATION

(71) Applicants: AT&T Intellectual Property I, L.P., Atlanta, GA (US); AT&T Mobility II LLC, Atlanta, GA (US)

(72) Inventors: Ajay Mahimkar, Edison, NJ (US); Karunasish Biswas, Sammamish, WA (US); Zihui Ge, Madison, NJ (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 17/097,231

(22) Filed: Nov. 13, 2020

(51) Int. Cl.
*H04W 28/20* (2009.01)
*H04W 28/22* (2009.01)
(Continued)

(52) U.S. Cl.
CPC ....... *H04W 28/20* (2013.01); *H04W 28/0808* (2020.05); *H04W 28/0867* (2020.05);
(Continued)

(58) Field of Classification Search
CPC . H04W 28/20; H04W 28/0808; H04W 48/12; H04W 48/16; H04W 28/22; H04W 28/0867; H04W 24/02; H04W 24/06; H04W 24/08; H04W 4/021; H04W 16/00; H04W 16/22; H04L 41/0823; H04L 41/0873; H04L 41/0876; H04L 41/0883; H04L 41/0886; H04L 41/14; H04L 41/142; H04L 41/145; H04L 41/147; H04L 41/16; H04L 43/08; H04L 43/0876; H04L 43/18

See application file for complete search history.

(56) References Cited

U.S. PATENT DOCUMENTS 8,050,191 B2 * 11/2011 Tirpak ................... G06Q 10/00
                                                              370/252
9,125,091 B2 * 9/2015 Heo ....................... H04L 5/0094
(Continued)

OTHER PUBLICATIONS

Mahimkar et al., "Auric: using data-driven recommendation to automatically generate cellular configuration", ACM SIGCOMM 2021 Conference, Aug. 2021, 14 pages.
(Continued)

*Primary Examiner* — Ahmed Elallam (57) ABSTRACT

A processing system may obtain values of carrier attributes for a new carrier to be deployed in a cellular network, obtain values of the carrier attributes and values of a configuration parameter for a plurality of existing carriers in the cellular network, and construct an attribute value matrix comprising the values of the carrier attributes for the plurality of existing carriers, where the attribute value matrix associates the carrier attributes to the plurality of existing carriers, apply a regression to a function associating the attribute value matrix to a vector of the values of the configuration parameter for the plurality of existing carriers to learn coefficients of the function, apply the coefficients to a vector comprising the values of the plurality of carrier attributes for the new carrier to generate a value of the configuration parameter for the new carrier, and apply the generated value to the new carrier.

20 Claims, 4 Drawing Sheets

(51) Int. Cl.
*H04W 28/08* (2009.01)
*H04W 24/02* (2009.01)
*H04W 48/12* (2009.01)
*H04W 16/00* (2009.01)
*H04W 48/16* (2009.01)
*H04W 24/08* (2009.01)

(52) U.S. Cl.
CPC ........... *H04W 28/22* (2013.01); *H04W 48/12* (2013.01); *H04W 48/16* (2013.01)

(56) References Cited

U.S. PATENT DOCUMENTS

| | | | |
|---|---|---|---|
| 9,426,776 B2* | 8/2016 | Bellamkonda | H04L 63/04 |
| 9,451,473 B2* | 9/2016 | Ouyang | H04L 47/127 |
| 9,603,033 B2* | 3/2017 | Garg | H04W 28/16 |
| 10,015,837 B2* | 7/2018 | Rahman | H04W 76/15 |
| 10,205,632 B2* | 2/2019 | Saavedra | H04L 69/14 |
| 10,425,832 B1* | 9/2019 | Zawadzki | H04L 41/5038 |
| 10,721,165 B2* | 7/2020 | Evans | H04L 41/0896 |
| 10,924,947 B2* | 2/2021 | Gray | H04Q 11/0067 |
| 10,979,914 B2* | 4/2021 | Li | H04W 24/02 |
| 11,102,069 B2* | 8/2021 | Kerpez | H04L 41/0631 |
| 2021/0160719 A1* | 5/2021 | Winter | G06N 3/04 |

OTHER PUBLICATIONS

Jason Brownlee, "Gentle Introduction to Vector Norms in Machine Learning", Machine Learning Mastery, Feb. 5, 2018, downloaded from https://machinelearningmastery.com/vector-norms-machine-learning/?nowprocket=1, 17 pages.

Christos Giannoulis, "Recalling Sets of Variables to Be on the Same Scale", The Analysis Factor, downloaded from https://www.theanalysisfactor.com/rescaling-variables-to-be-same/ on Oct. 8, 2020, 7 pages.

Karen Grace-Martin, "The Distribution of Independent Variables in Regression Models", The Analysis Factor, downloaded from https://www.theanalysisfactor.com/the-distribution-of-independent-variables-in-regression-models-2/ on Oct. 8, 2020.

Frank Wood, "Matrix Approach to Linear Regression", Lecture 11, downloaded from http://www.stat.columbia.edu/~fwood/Teaching/w4315/Fall2009/lecture_11 on Oct. 8, 2020, 36 pages.

"Regularization: Ridge Regression and the LASSO" Statistics 305: Autumn Quarter 2007/2007, Nov. 29, 2006, downloaded from https://statweb.stanford.edu/~tibs/sta305files/Rudyregularization.pdf, 56 pages.

* cited by examiner

FIG. 4

ZERO TOUCH CELLULAR CARRIER CONFIGURATION

The present disclosure relates generally to cellular networks, and more particularly to apparatuses, non-transitory computer-readable media, and methods for generating and applying a value for a configuration parameter to a new carrier in a cellular network in accordance with a collaborative filtering, and to apparatuses, non-transitory computer-readable media, and methods for determining and applying a particular value of a configuration parameter to a new carrier when the particular value exceeds a threshold margin of a percentage of a plurality of existing carriers having the particular value for the configuration parameter.

BACKGROUND

Network operators add carriers in cellular networks in order to support the increasing demand in voice and data traffic and to provide high quality of service to the users. Addition of new carriers may require the network operator to accurately configure the carrier parameters for desired performance. This may be challenging because of the large number of parameters related to user mobility, interference, load balancing, and handover management, and their heterogeneous need to configure different values across different locations to handle user and traffic behaviors and different signal propagation patterns.

SUMMARY

In one example, the present disclosure discloses an apparatus, computer-readable medium, and method for generating and applying a value for a configuration parameter to a new carrier in a cellular network in accordance with a collaborative filtering. For example, a processing system having at least one processor may obtain values of a plurality of carrier attributes for a new carrier to be deployed in a cellular network, obtain values of the plurality of carrier attributes and values of a configuration parameter for a plurality of existing carriers in the cellular network, and construct an attribute value matrix comprising the values of the plurality of carrier attributes for the plurality of existing carriers, where the attribute value matrix associates the plurality of carrier attributes to the plurality of existing carriers. The processing system may then apply a regression to a function associating the attribute value matrix to a vector of the values of the configuration parameter for the plurality of existing carriers to learn coefficients of the function, apply the coefficients to a vector comprising the values of the plurality of carrier attributes for the new carrier to generate a value of the configuration parameter for the new carrier, and apply the value of the configuration parameter to the new carrier.

In another example, the present disclosure discloses an apparatus, computer-readable medium, and method for determining and applying a particular value of a configuration parameter to a new carrier when the particular value exceeds a threshold margin of a percentage of a plurality of existing carriers having the particular value for the configuration parameter. For example, a processing system having at least one processor may obtain values for a plurality of carrier attributes of a new carrier to be deployed at a base station in a cellular network, determine a plurality of existing carriers in the cellular network having values for the plurality of carrier attributes that are the same as the values for the plurality of carrier attributes of the new carrier, where the plurality of carrier attributes is non-independent with respect to a configuration parameter of the plurality of existing carriers, and obtain values of the configuration parameter for the plurality of existing carriers. The processing system may then determine that a particular value of the values for the configuration parameter exceeds a threshold margin of a percentage of the plurality of existing carriers having the particular value for the configuration parameter, and apply the particular value for a configuration parameter to the new carrier when the particular value is determined to exceed the threshold margin.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses apparatuses, computer-readable media, and methods for generating and applying a value for a configuration parameter to a new carrier in a cellular network in accordance with a collaborative filtering, and apparatuses, computer-readable media, and methods for determining and applying a particular value of a configuration parameter to a new carrier when the particular value exceeds a threshold margin of a percentage of a plurality of existing carriers having the particular value for the configuration parameter. Notably, network operators add carriers in cellular networks in order to support the increasing demand in voice and data traffic and to provide high quality of service to the users. Addition of new carriers may require the network operator to accurately configure the carrier's configuration parameters for desired performance. This may be challenging because of the large number of parameters related to user mobility, interference, load balancing, and handover management, and their heterogeneous need to configure different values across different locations to handle user and traffic behaviors and different signal propagation patterns. Manual configuration parameter value selection can be time-consuming, tedious, and error-prone, and may result in poor performance experienced by end users. For instance, a vast number of configuration parameters values may need to be selected for each carrier in each cell, with a vast number of cells in a nationwide network. In addition, there are complex interactions among configuration parameters for a given carrier and among other carriers within the same cell and nearby cells. At the same time, a network operator may need to adjust configuration parameter values in response to specific customer demands, which may in turn affect the quality of service of other customers.

Determining the best configuration is often considered an operations art, in which the best practices adapt as the technology evolves, the network devices and mobile handsets upgrade, and operational understanding improves over time. A typical cellular carrier deployment contains hundreds of configuration parameters governing the cellular control behavior related to traffic/layer management, channel interference management, handover management, failure management, etc. In one approach, a self-optimizing network (SON) performs automated configuration and tuning based on a local trial-and-optimize strategy. Thus, a SON automates the search and tuning of configuration parameters; however, it still requires a human to create and manage the rule-book.

Examples of the present disclosure provide a configuration parameter value selection, recommendation, and deployment system to automatically and accurately select and set configuration parameter values for carriers added in cellular networks. In particular, examples of the present disclosure provide machine learning models based on nearest neighbors and collaborative filtering to automatically determine configuration parameter values for new carriers using similarities across existing carriers and in consideration of the locality of the new carrier in the cellular network. In accordance with the present disclosure, similarity is defined using multiple attributes of a carrier and/or the base station/cell at which a carrier is deployed such as: vendor, carrier frequency, carrier type (e.g., FirstNet, NB-Iot), carrier number, channel bandwidth, hardware version (e.g., remote radio head (RRH) type, or the like), software version, cell/base station location, a base station demographic characteristic/morphology (e.g., urban, suburban, rural, etc.), available downlink multiple input-multiple output (MIMO) modes, and other carrier and/or base station/cell site information. Nearby cells and carriers (or "neighbors") are defined based on network topology relationships, such as X2 links, geographic distance, e.g., within a 25 mile radius, a 50 mile radius, etc., within a same map grid, etc. Using one or both of collaborative filtering or nearest neighbor-based learning models, examples of the present disclosure then recommend configuration parameter values based on match criteria and/or automatically apply the configuration parameter values for the new carriers.

It should be noted that there may be hundreds of configuration parameters per carrier that may be automatically tuned in accordance with the present disclosure. For illustrative purposes, several are outlined in further detail herein. For instance, a first configuration parameters may comprise "a3Offset" (an LTE base transceiver station (BTS) Cell Radio Network (RNW) (LNCEL) parameter), which may represent a handover margin for better cell handover (HO). This configuration parameter may be used in measurement event type A3 where the event is triggered when the neighbor cell becomes better than the serving cell by the value of the A3 offset. This parameter is used for both reference signal received power (RSRP) and reference signal received quality (RSRQ)-based A3 measurement for intra-frequency HO measurements.

A second configuration parameter "actInterFreqLB" (another LNCEL parameter) may comprise an indicator of an activation status of inter-frequency load balancing (iFLB) feature. If the feature iFLB is activated ("true"), inter-frequency load measurements are performed per cell. Dependent on the actual load situation, endpoint devices, or user equipment (UEs), might be handovered to lesser loaded neighbor cells (different frequency layer). A third configuration parameter "dlInterferenceEnable" (another LNCEL parameter) may indicate an enable status of downlink interference generation. A fourth configuration parameter "cacHeadroom" (an active mode load equalization parameter (AMLEPR)) may comprise an active mode load equalization feature in which a certain target cell shall leave the "active state," if the reported call admission control (CAC) value from this target cell is smaller than the CAC headroom for the target cells frequency layer. A fifth configuration parameter "sFreqPrio" may be used in a comparison between two candidate SCells. This comparison is based on a measure of the average load in uplink, and can be biased towards a cell by giving it a higher priority. It is also used in the relative comparison to pFreqPrio in a primary cell (PCell) swap algorithm (e.g., sFreqPrio=1 (default) for highest priority, sFreqPrio=10000 for lowest priority). To prioritize unlicensed against licensed cells, their sFreqPrio values may be set at least one decade apart (e.g., [1-10] vs. [100-10000]).

A sixth configuration parameter "actPdcchLoadGen" (an LNCEL frequency division duplex (LNCEL_FDD) parameter) may comprise an activation status of physical downlink control channel (PDCCH) load generation. A seventh configuration parameter "pdcchLoadLevel" (another LNCEL_FDD parameter) may define a load level representing the percentage of used PDCCH control channel elements (CCEs) on all available PDCCH CCEs. Used PDCCH CCEs include all CCEs of common search space (CSS)/UE-specific search space (USS) and dummy PDCCHs. This parameter will not restrict normal PDCCH allocation. Only when normal PDCCH load has not reach the level defined by this parameter may dummy PDCCHs be added. This parameter is mandatory when actPdcchLoadGen is set to "true." An eighth configuration parameter "interFrqQThrHighR9" (an inter frequency idle mode (IRFIM) parameter) specifies an inter-frequency quality threshold used by a UE when reselecting towards a higher priority frequency than the currently serving frequency.

A ninth parameter "a3OffsetRsrpInterFreqQci1" (a handover parameters to neighboring interfrequency LTE cell (LNHOIF) parameter) may comprise an A3 offset RSRP inter-frequency during QCI1 handover margin for better cell handover when a UE has a QCI1 bearer. For instance, the RSRP offset value may be used as an EUTRA measurement report triggering condition for event A3 when UE has a QCI1 bearer. The event is triggered when the neighbor cell becomes better in RSRP than the serving cell by at least the A3 offset. In one example, the information element (IE) value is multiplied by 2. A tenth parameter "thresholdRsrpI-FLBFilter" (another LNHOIF parameter) may comprise an inter-frequency load balancing threshold for RSRP target filtering. For instance, this threshold may be for filtering target cells out of reported A4 event based on RSRP values due to inter-frequency load balancing. It should be noted that this parameter is aimed for postprocessing the related A4 report and is not for any report configuration in the UE. An eleventh parameter "hysB2ThresholdUtra" (a handover parameters to neighboring WCDMA cell (LNHOW) parameter) may comprise related hysteresis thresholds B2Th1, B2Th2 HO WCDMA and related hysteresis of handover margin for HO to WCDMA. This parameter may be used within the entry and leave condition of the B2 triggered reporting condition. In one example, the IE value is multiplied by 2. A twelfth parameter "qrxlevmin" (a system information block (SIB) cell access related parameter) may specify a minimum RSRP receive level in cell. A thirteenth parameter, "threshSrvLow" (another SIB parameter) may specify a (low) threshold for the serving frequency used in reselection evaluation towards lower priority EUTRAN frequency or RAT. It should again be noted that the foregoing are just a small sample of numerous possible configuration parameters that may be addressed in accordance with the present disclosure.

Thus, examples of the present disclosure automatically determine initial configuration parameter values for new carriers added in cellular networks. This enables zero-touch configuration for new carriers. In particular, there is no requirement to manually create and maintain a rule-book for configurations. Examples of the present disclosure are highly scalable and can handle a large and diverse number of configuration parameters and a large number of carriers. In addition, new configuration parameters and new carriers may be rapidly incorporated into the learning framework. In particular, as the cellular network evolves, the present disclosure may adapt the learning functions(s), or model(s), based on configuration parameter changes in the cellular network and the new carriers being added. These and other aspects of the present disclosure are discussed in greater detail below in connection with the examples of FIGS. 1-4.

Figure 1:
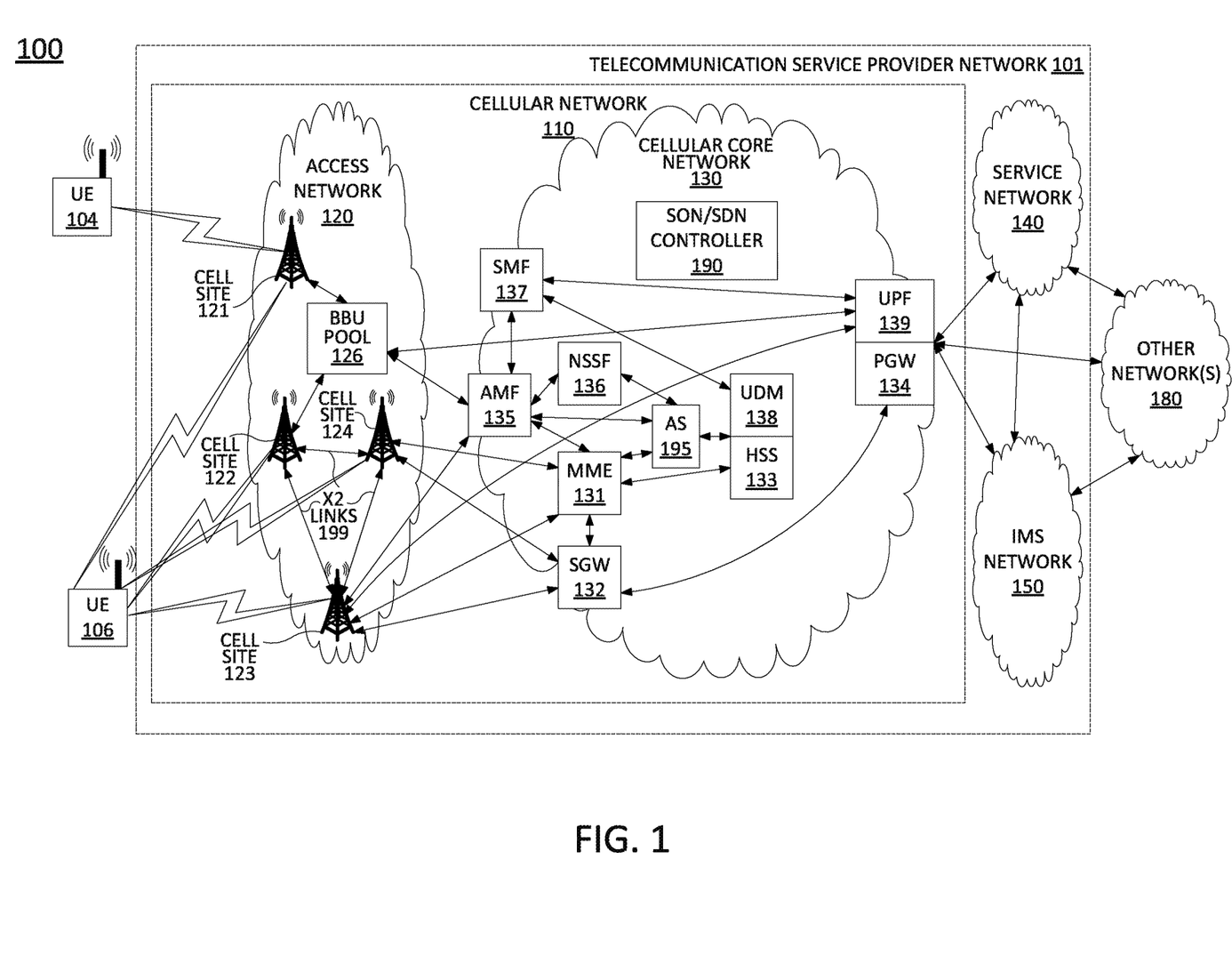
FIG. 1 illustrates a block diagram of an example system, in accordance with the present disclosure.

FIG. 1 illustrates an example network, or system 100 in which examples of the present disclosure may operate. In one example, the system 100 includes a telecommunication service provider network 101. The telecommunication service provider network 101 may comprise a cellular network 110 (e.g., a 4G/Long Term Evolution (LTE) network, a 4G/5G hybrid network, or the like), a service network 140, and an IP Multimedia Subsystem (IMS) network 150. The system 100 may further include other networks 180 connected to the telecommunication service provider network 101.

In one example, the cellular network 110 comprises an access network 120 and a cellular core network 130. In one example, the access network 120 comprises a cloud radio access network (RAN). For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126. In accordance with the present disclosure, any one or more of cell sites 121-123 may be deployed with antenna and radio infrastructures, including multiple input multiple output (MIMO) and millimeter wave antennas.

In one example, access network 120 may include both 4G/LTE and 5G/NR radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

As illustrated in FIG. 1, cell sites, or base stations (e.g., cell sites 122-124), may be connected to each other via X2 links 199. X2 links may be implemented via physical links, e.g., fiber connections, wireless base station-to-base station links, or virtual links. For instance, with respect to virtual links, in the example of FIG. 1, cell site 121 and cell site 122 may comprise base stations that are implemented at least partially on shared hardware (e.g., BBU pool 126) such that no external physical or wireless link is used. Similarly, to the extent that 5G and LTE infrastructure may be implemented at the same cell site/base station, an X2 interface may similarly be virtual in nature, or may comprise a short physical connection between two sets of co-located base station equipment. It should be noted that in one example, the present disclosure delineates network neighbors based upon X2 adjacency in connection with determining configuration parameter values for new carriers, as discussed in greater detail below in connection with the examples of FIGS. 2-3.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network devices such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 2G network components, 3G network components, 5G network components, etc. Thus, cellular core network 130 may comprise an integrated network, e.g., including any two or more of 2G-5G infrastructures and technologies, and the like. For example, as illustrated in FIG. 1, cellular core network 130 further comprises 5G components, including: an access and mobility management function (AMF) 135, a network slice selection function (NSSF) 136, a session management function (SMF), a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, and so forth.

In one example, SMF 137 may perform endpoint device IP address management, UPF selection, UPF configuration for endpoint device traffic routing to an external packet data network (PDN), charging data collection, quality of service (QoS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., an "NC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure may also relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and or users. For example, telecommunication service provider network 101 may provide a cloud storage service, web server hosting, and other services. As such, service network 140 may represent aspects of telecommunication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1.

Figure 4:
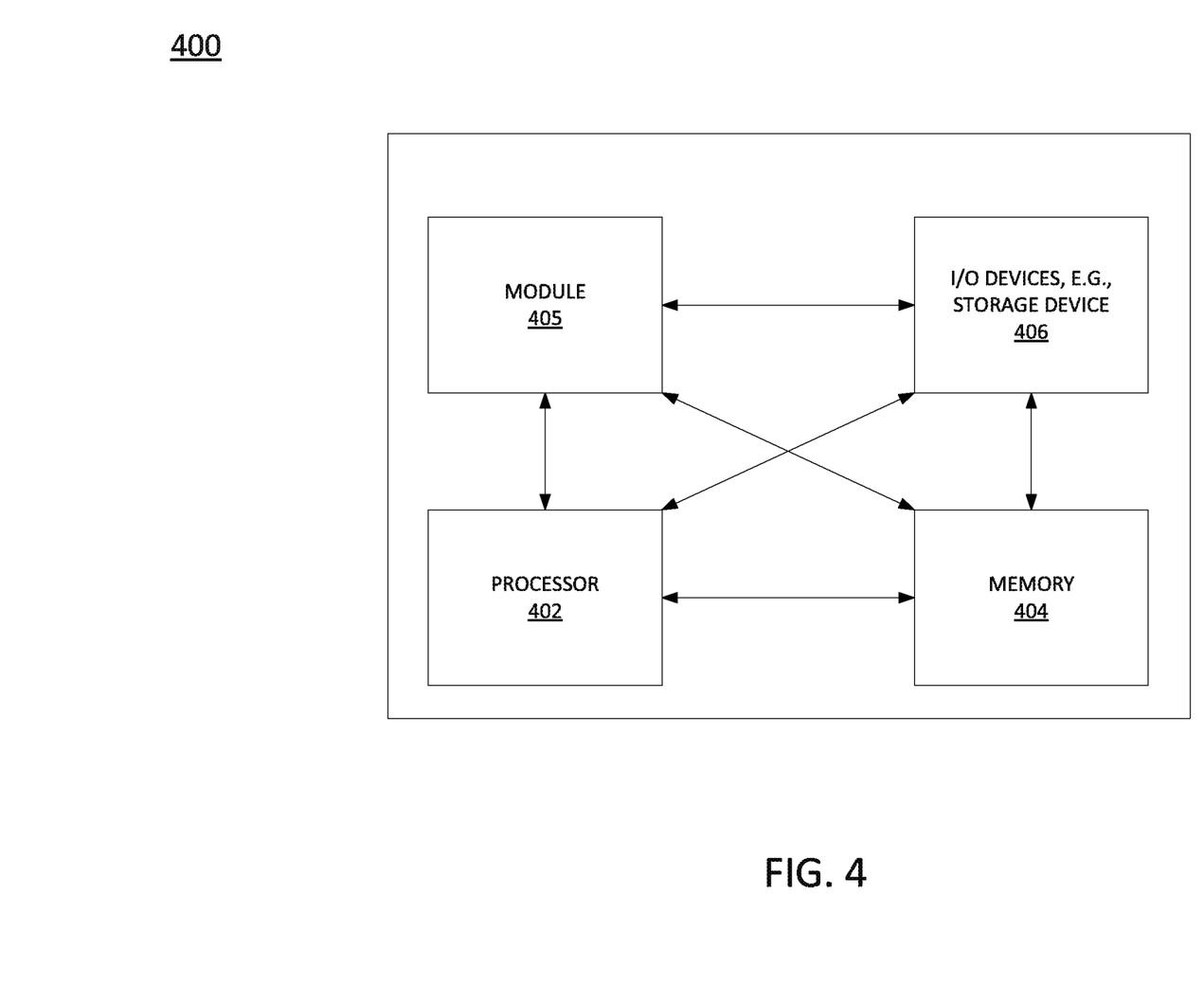
FIG. 4 illustrates a high level block diagram of a computing device specifically programmed to perform the steps, functions, blocks and/or operations described herein.

In this regard, the cellular core network 130 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. In accordance with the present disclosure, SON/SDN controller 190 may comprise all or a portion of a computing system, such as computing system 400 as depicted in FIG. 4, and may be configured to provide one or more functions in connection with examples of the present disclosure for generating and applying a value for a configuration parameter to a new carrier in a cellular network in accordance with a collaborative filtering and/or in connection with examples of the present disclosure for determining and applying a particular value of a configuration parameter to a new carrier when the particular value exceeds a threshold margin of a percentage of a plurality of existing carriers having the particular value for the configuration parameter. For instance, SON/SDN controller 190 may activate and deactivate antennas/remote radio heads of cell sites 121 and 122, respectively, may steer antennas/remote radio heads of cell sites 121 and 122 (e.g., adjusting vertical tilt angles, azimuth bearings, beamwidths, power levels, and or other settings), may allocate or deallocate (or activate or deactivate) baseband units in BBU pool 126, may add (or remove) one or more network slices, and may perform other operations for adjusting configurations of components of cellular network 110 in accordance with the present disclosure.

In accordance with the present disclosure, SON/SDN controller 190 may set and adjust various values of configuration parameters for carriers in operation at the various cell sites 121-124 of the cellular network 110. While there may be hundreds of configuration parameters per carrier, a few are described herein by way of example, such as those noted above, e.g., a handover margin, an inter-frequency load balancing activation status, a downlink interference generation enable status, an active mode load equalization enable status, an average uplink load biasing parameter for secondary cell selection, an inter-cell load generation for physical downlink control channel enable status, a physical downlink control channel load level parameter, an inter-frequency quality threshold for reselecting a higher priority frequency, an reference signal received power inter-frequency handover margin for handover to a neighboring base station, an inter-frequency load balancing threshold for reference signal received power target cell filtering, a hysteresis threshold for a handover margin for handover to wideband code division multiple access, a minimum transmit reference signal received power level in a cell, a reselection threshold for evaluating a lower priority frequency or a lower priority radio access technology, and so forth.

Figure 2:
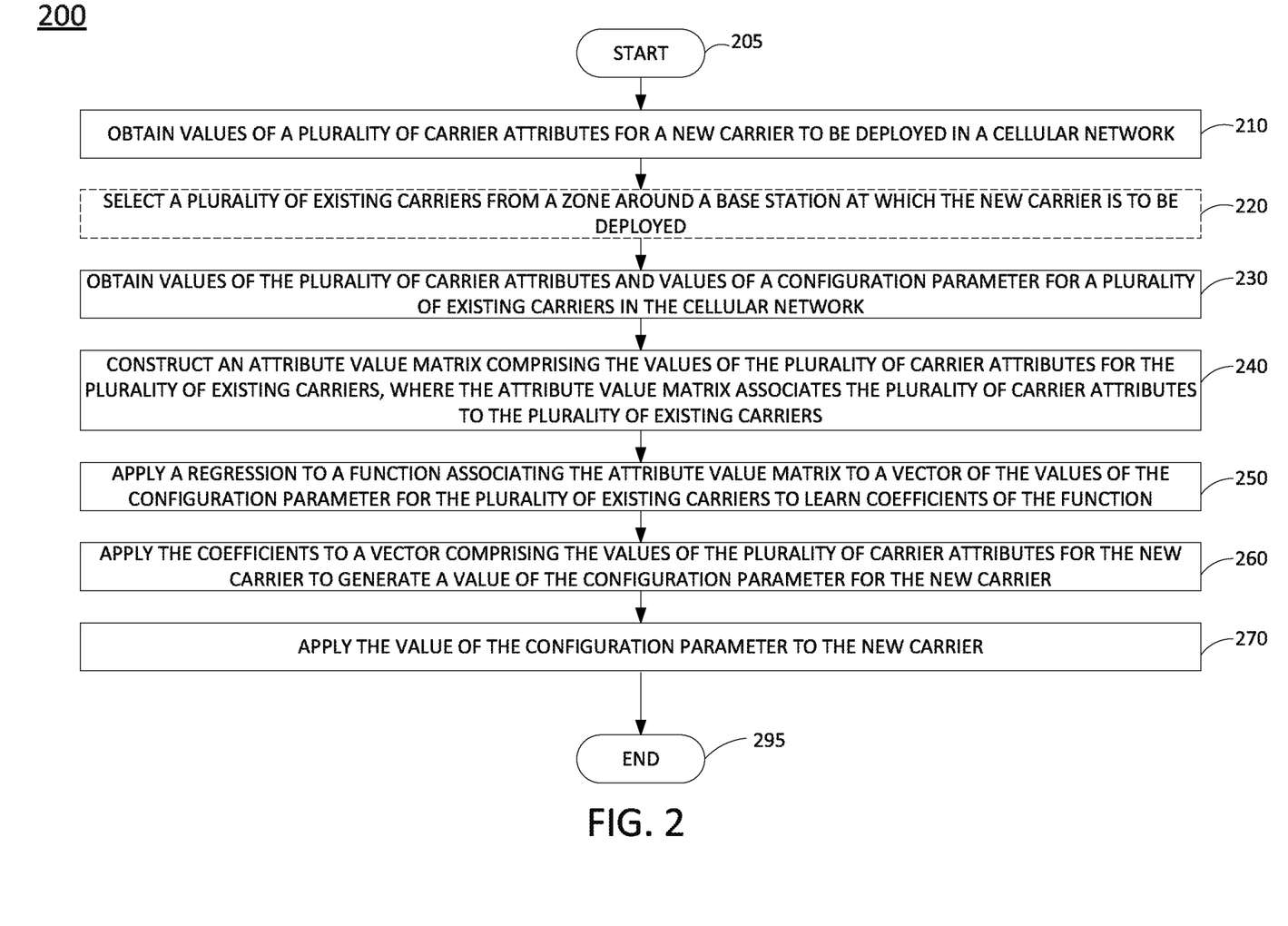
FIG. 2 illustrates a flowchart of an example method for generating and applying a value for a configuration parameter to a new carrier in a cellular network in accordance with a collaborative filtering.
Figure 3:
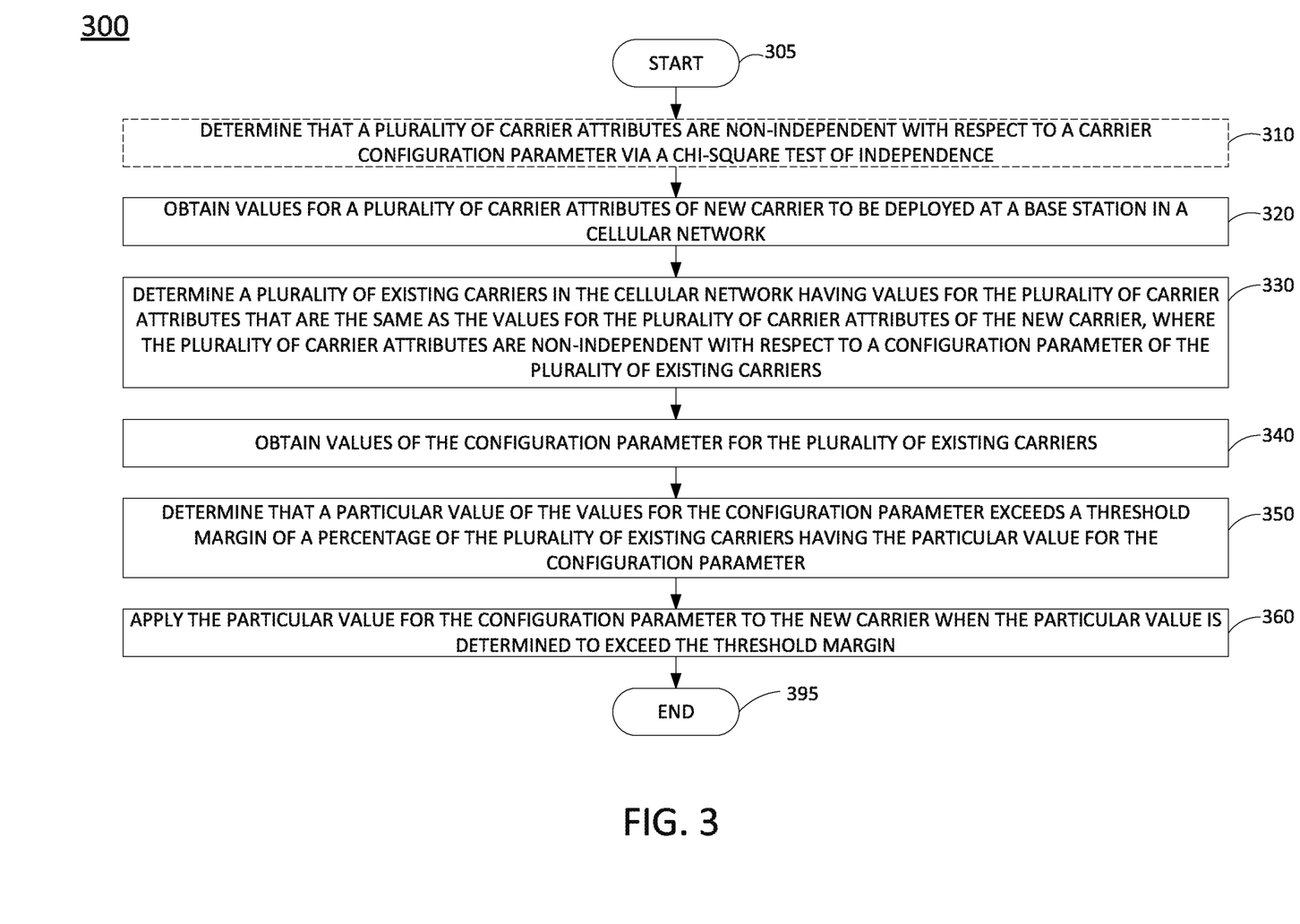
FIG. 3 illustrates a flowchart of an example method for determining and applying a particular value of a configuration parameter to a new carrier when the particular value exceeds a threshold margin of a percentage of a plurality of existing carriers having the particular value for the configuration parameter.

For instance, SON/SDN controller 190 may be configured to perform operations for generating and applying a value for a configuration parameter to a new carrier in a cellular network in accordance with a collaborative filtering (e.g., using collaborative filtering/regression-based learning model in accordance with the example of FIG. 2) and/or for determining and applying a particular value of a configuration parameter to a new carrier when the particular value exceeds a threshold margin of a percentage of a plurality of existing carriers having the particular value for the configuration parameter (e.g., using a nearest neighbors with tests of independence learning model in accordance with the example of FIG. 3). For example, SON/SDN controller 190 may determine values of configuration parameters for new carriers to be added at cell sites 121-124 and may implement these values, e.g., via instructions to cell sites 121-124 and/or BBU pool 126. In one example, SON/SDN controller 190 may also configure and reconfigure other components of cellular network 110 in response thereto, such as activating remote radio heads (RRHs) and/or BBU pools to provide additional active base stations or sectors (e.g., where such physical components are already deployed and installed, but are inactive), instructing base stations/RRHs to adjust vertical tilt angles, azimuth bearings, beamwidths, power levels, and or other settings, adding (or removing) one or more network slices, and so on.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

Accordingly, the SON/SDN controller 190 may be connected directly or indirectly to any one or more network elements of cellular core network 130, and of the system 100 in general. Due to the relatively large number of connections available between SON/SDN controller 190 and other network elements, none of the actual links to the SON/SDN controller 190 are shown in FIG. 1. Similarly, intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and 106. UE 104 and 106 may each comprise a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device (broadly, "an endpoint device"). In one example, each of UE 104 and UE 106 may each be equipped with one or more directional antennas, or antenna arrays (e.g., having a half-power azimuthal beamwidth of 120 degrees or less, 90 degrees or less, 60 degrees or less, etc.), e.g., MIMO antenna(s) to receive multi-path and/or spatial diversity signals. Each of UE 104 and UE 106 may also include a gyroscope and compass to determine orientation(s), a global positioning system (GPS) receiver for determining a location (e.g., in latitude and longitude, or the like), and so forth. In one example, each of UE 104 and UE 106 may include a built-in/embedded barometer from which measurements may be taken and from which an altitude or elevation of the respective endpoint device may be determined. In one example, each of UE 104 and UE 106 may also be configured to determine location/position from near field communication (NFC) technologies, such as Wi-Fi direct and/or other IEEE 802.11 communications or sensing (e.g., in relation to beacons or reference points in an environment), IEEE 802.15 based communications or sensing (e.g., "Bluetooth", "ZigBee", etc.), and so forth.

As illustrated in FIG. 1, UE 104 may access wireless services via the cell site 121 (e.g., NR alone, where cell site 121 comprises a gNB), while UE 106 may access wireless services via any of cell sites 121-124 located in the access network 120 (e.g., for NR non-dual connectivity, for LTE non-dual connectivity, for NR-NR DC, for LTE-LTE DC, for EN-DC, and/or for NE-DC). For instance, in one example, UE 106 may establish and maintain connections to the cellular core network 130 via multiple gNBs (e.g., cell sites 121 and 122 and/or cell sites 121 and 122 in conjunction with BBU pool 126). In another example, UE 106 may establish and maintain connections to the cellular core network 130 via a gNB (e.g., cell site 122 and/or cell site 122 in conjunction with BBU pool 126) and an eNodeB (e.g., cell site 124), respectively. In addition, either the gNB or the eNodeB may comprise a PCell, and the other may comprise a SCell for dual connectivity, as described herein. Furthermore, either or both of NR/5G and or EPC (4G/LTE) core network components may manage the communications between UE 106 and the cellular network 110) via cell site 122 and cell site 124.

In one example, UE 106 may also utilize different antenna arrays for 4G/LTE and 5G/NR, respectively. For instance, 5G antenna arrays may be arranged for beamforming in a frequency band designated for 5G high data rate communications. For instance, the antenna array for 5G may be designed for operation in a frequency band greater than 5 GHz. In one example, the array for 5G may be designed for operation in a frequency band greater than 20 GHz. In contrast, an antenna array for 4G may be designed for operation in a frequency band less than 5 GHz, e.g., 500 MHz to 3 GHz. In addition, in one example, the 4G antenna array (and/or the RF or baseband processing components associated therewith) may not be configured for and/or be capable of beamforming. Accordingly, in one example, UE 106 may turn off a 4G/LTE radio, and may activate a 5G radio to send a request to activate a 5G session to cell site 122 (e.g., when it is chosen to operate in a non-DC mode or an intra-RAT dual connectivity mode), or may maintain both radios in an active state for multi-radio (MR) dual connectivity (MR-DC).

In one example, the cellular core network 130 further includes an application server (AS) 195. For instance, AS 195 may comprise all or a portion of a computing system, such as computing system 400 as depicted in FIG. 4, and may be configured to perform operations for generating and applying a value for a configuration parameter to a new carrier in a cellular network in accordance with a collaborative filtering (e.g., using collaborative filtering/regression-based learning model in accordance with the example of FIG. 2) and/or for determining and applying a particular value of a configuration parameter to a new carrier when the particular value exceeds a threshold margin of a percentage of a plurality of existing carriers having the particular value for the configuration parameter (e.g., using a nearest neighbors with tests of independence learning model in accordance with the example of FIG. 3). For example, AS 195 may perform such operations as an alternative to, or in addition to SON/SDN controller 190. For instance, to the extent that the examples of the present discourse may include training and testing learning models, applying attributes of new carriers to the trained learning model(s) to determine values of configuration parameters, and so forth, SON/SDN controller 190 may be tasked with activating new carriers and implementing the determined values of various configuration parameters for the carriers (e.g., in addition to other responsibilities of SON/SDN controller 190), while AS 190 may be tasked with training and/or implementing the learning model(s) to determine the configuration parameters. In this regard, it should be noted that in one example, AS 195 may be further split into two components which may comprise physically separate hardware: a training/testing component (e.g., to train and/or test the learning model(s) with labeled training and/or testing data) and a deployment component (for applying the learning model(s) to select values of configuration parameters for new carriers and to transmit recommendations or instructions to SON/SDN controller 195).

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA)

which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs). In one example, any one or more of cell sites 121-123 may comprise 2G, 3G, 4G and/or LTE radios, e.g., in addition to 5G new radio (NR), or gNB functionality. For instance, cell site 123 is illustrated as being in communication with AMF 135 in addition to MME 131 and SGW 132. Thus, these and other modifications are all contemplated within the scope of the present disclosure.

As noted above, the present disclosure includes collaborative filtering/regression-based learning models as well as nearest neighbors with tests of independence learning models. In one example, the present disclosure may utilize one or more data structures such as in accordance with Table 1:

TABLE 1

| | ATTRIBUTES | | | PARAMETERS | | |
|---|---|---|---|---|---|---|
| $X_1$ | $X_2$ | ... | $X_K$ | $Y_1$ | $Y_2$ | ... | $Y_M$ |
| $C_1$ | | | | | | |
| $C_2$ | | | | | | |
| $C_3$ | | | | | | |
| ... | | | | | | |
| $C_{N-1}$ | | | | | | |
| $C_N$ | | | | $Y_{(1),N}$ | $Y_{(2),N}$ | ... | $Y_{(M),N}$ |

The following notations are utilized in connection with Table 1: $C_i$ is the $i^{th}$ carrier, $X_j$ is the $j^{th}$ attribute of the carrier, $Y_K$ is the $K^{th}$ parameter of the carrier, $X_{N,K}$ is a matrix of the carrier attributes with N carriers and K attributes (which may also be referred to as X, for shorthand), $Y_{(i)}$ is a vector for the parameter i (i=1 . . . M), $C_N$ is a new carrier with known attribute values $X_1, X_2, \ldots X_K$. In one example, the goal is to identify the values for the parameters $Y_{(1),N}$, $Y_{(2),N}, \ldots Y_{(M),N}$ (the configuration parameter values for parameters 1 to M, for the new carrier, $C_N$).

In one example, the present disclosure provides for learning and recommendation of values of configuration parameters for new carriers using a collaborative filtering/regression-based learning model, or function. For instance, in one example, the learning model may be in accordance with Equation 1:

$$Y_{(i)} = \beta_{(i)} * X \qquad \text{Equation 1:}$$

In one example, values for each entry in matrix X is populated using attribute values for existing carriers $C_1$, $C_2, \ldots C_{N-1}$. Similarly, values for each entry in each vector $Y_{(i)}$ (i=1 to M) may be populated using known values of configuration parameters for existing carriers $C_1$ to $C_{N-1}$.

In one example, the coefficients of the learning function, or beta coefficients, $\beta_{(i)}$ (a vector of length N for each $Y_{(i)}$ (e.g., column vector $Y_1$, column vector $Y_2$, etc.)) may then be learned using regression methods including lasso, ridge, logistic, or deep learning (multi-layer perceptron). For instance, a lasso regression may be in accordance with Equation 2:

$$\min \|y - \beta X\|_2 + \lambda \|\beta\|_1 \qquad \text{Equation 2:}$$

Similarly, ridge regression may be in accordance with Equation 3:

$$\min \|y - \beta x\|_2 + \lambda \|\beta\|_2 \qquad \text{Equation 3:}$$

In Equations 2 and 3, $\|.\|_p$ is $l_p$ norm, and $\lambda$ is a regularization parameter: $\lambda \epsilon [0, 1]$. After learning the model/function coefficients (e.g., beta coefficients), the beta coefficients and a vector of attributes for a new carrier $C_N$ (e.g., row/horizontal vector $X_N = [X_{N,1}, X_{N,2}, \ldots X_{N,K}]$) may then be used to predict $Y_{(1),N}, Y_{(2),N}, \ldots Y_{(M),N}$ (the configuration parameter values for parameters 1 to M, for the new carrier, $C_N$). For instance, $Y_{(i),N} = \beta_{(i)} * X_N$ may be calculated in accordance with Equation 1. In one example, a similar approach may be implemented to learn model/function coefficients via a multi-layer perceptron, which may learn a non-linear function and include one or more non-linear layers.

In one example, since X and Y can contain nominal variables, a one-hot encoding may be used to translate the nominal variable into one or more attributes or configuration parameters (e.g., instead of a single column). For example, if a hardware version attribute can take the values of H1, H2, H3, three columns may be created in matrix X for H1, H2, and H3, respectively. For each carrier (e.g., for each row), the corresponding value is binary (either 0 or 1) for each column corresponding to H1, H2, H3. In addition, only one of the values may be a 1, while the others are zero. In one example, the values of attributes and/or configuration parameters may also be regularized or converted to similar scales among different attributes and/or configuration parameters, e.g., such that no one attribute may have outsize influence on the model and skew the resulting predictions of corresponding configuration parameter values. For instance, rather than using the actual attribute values, for purposes of generating matrix X, attribute values may be scaled to a standard deviation metric (e.g., from a mean value, from a median value, etc.), adjusted to a scaled range from 0 to 100 rather than the actual range of parameter values (which could be −10,000 to 10,000, for example), and so on. It should also be noted that the present learning model may be updated periodically, to account for new carriers that have been added to the cellular network. In other words, the present model may comprise a "boosted" collaborative filtering model.

As noted above, examples of the present disclosure may also train and deploy a "nearest neighbors" with tests of independence learning model. For instance, the "tests of independence" may identify non-independent attributes $X_j$ for each of parameter vector $Y_{(i)}$, e.g., using a chi-square test of independence, or the like. For instance, for a given configuration parameter, the chi-square test may differentiate certain attributes that are more strongly correlated with prediction of the resulting configuration parameter values for a given input carrier. In one example, the present disclosure may first identify similar carriers within a geographical neighborhood (e.g., 1-hop network neighbors via an X2 interface, 2-hop network neighbors, within a same market, within a threshold geographic distance, etc.) (e.g., "nearest neighbors") and that also have matching values on the non-independent attributes (e.g., an exact match/100 percent match, a match across at least 90 percent of the non-independent attributes, etc.). With these "similar neighbor carriers," the present disclosure may then apply a voting filter to identify a value for each configuration parameter $Y_{(1),N}$ to $Y_{(M),N}$ for the new carrier $C_N$.

For instance, for each value of a configuration parameter that is associated with at least one of the similar neighbor carriers, a percentage score may be assigned to that value equal to 100 times the number of similar neighbor carriers with that value divided by the total number of similar neighbor carriers. It should again be noted that this is only for the carriers that have similarity to the new carrier on the non-independent attributes (e.g., exact matches, 90 percent matches, etc.). In one example, a recommended value for that configuration parameter for the new carrier $C_N$ is that value which has the highest percentage score and that is also greater than or equal to a voting percentage threshold. For instance, a voting percentage threshold of 75 percent may be used to filter recommendations. For example, any percentage less than 75 percent may be ignored, even if a value is determined to be the most popular value for the configuration parameter that is deployed across the existing similar neighbor carriers. In one example, the present disclosure may implement a weighted voting with a temporal aspect. For instance, if 20 percent of the similar neighbor carriers have a configuration parameter value of x=6, which were set within last week, whereas 80 percent of the similar neighbor carriers have the value x=4, but which were set further in the past, it may be possible that the more recently set is more accurate. Thus, in one example, the counts for configuration parameter value voting may be weighted with temporal information to favor (more heavily weight) those that were more recently set.

It should be noted that the present approach using a nearest neighbors and tests of independence model may omit recommendations or determinations for certain configuration parameters for which a most widely implemented value among similar neighbor carriers still fails to meet a minimum percentage threshold. In such case, the present disclosure may select and implement those omitted values using other techniques, such as manually setting the value of a configuration parameter using expertise and experience of network operations personnel, or using other SON techniques, such as trial and error-based incremental optimization, and so forth. In accordance with the present disclosure, in one example, any values for which a minimum percentage threshold is not reached as a result of the voting may instead be set using the complementary above-described collaborative filtering/regression-based learning model. It should also be noted that in one example, the foregoing collaborative filtering/regression-based learning model may be utilized as a primary model, while the nearest neighbors with tests of independence learning model may be used as a secondary model, or vice versa. For instance, a tentative set of configuration parameter values may be set for a new carrier using the collaborative filtering/regression-based learning model. In parallel or following the completion, the nearest neighbors with tests of independence learning model may also be applied to determine any recommended values. For configuration parameter values for which a percentage threshold is exceeded, those values may then be used to replace corresponding values determined via the collaborative filtering/regression-based learning model. In still another example, configuration parameter values for which a percentage threshold is exceeded using the nearest neighbors with tests of independence learning model may be used to verify or confirm those corresponding values selected via the collaborative filtering/regression-based learning model. Thus, these and other modifications are all contemplated within the scope of the present disclosure.

FIG. 2 illustrates a flowchart of an example method 200 for generating and applying a value for a configuration parameter to a new carrier in a cellular network in accordance with a collaborative filtering, in accordance with the present disclosure. In one example, steps, functions and/or operations of the method 200 may be performed by a component of system 100 of FIG. 1, e.g. a SON/SDN controller 190, application server 195, and so forth, or by one or more components of the system 100 in conjunction with another component, or components thereof, e.g., application server 195 in conjunction with SON/SDN controller 190, cell sites 121-124, and so forth. In one example, the steps, functions, or operations of method 200 may be performed by a computing device or system 400, and/or a processing system 402 as described in connection with FIG. 4 below. For instance, the computing device or system 400 may represent at least a portion of an application server or controller that is configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or system 400 may collectively function as a processing system. For illustrative purposes, the method 200 is described in greater detail below in connection with an example performed by a processing system. The method 200 begins in step 205 and proceeds to step 210.

At step 210, the processing system obtains values of a plurality of carrier attributes for a new carrier to be deployed in a cellular network. For example, as noted above, the plurality of carrier attributes may comprise at least one of: a base station hardware version, a base station software version, a carrier channel frequency, a carrier channel bandwidth, a base station location, a carrier type, a base station demographic characteristic, or a downlink multiple input multiple output mode. In one example, the plurality of carrier attributes includes at least two carrier attributes associated with a same nominal attribute, where the at least two carrier attributes represent a one-hot encoding of the nominal attribute. In one example, a values of at least one of the plurality of carrier attributes for the new carrier is scaled in accordance with a scaling function (e.g., per standard deviations from a mean or median value over a number of carriers (e.g., all carriers, all carriers in a zone of the cellular network, etc.), to scale a range of possible values of an attribute from an actual minimum and maximum to 0 and 100, respectively, and so forth).

At optional step 220, the processing system may select a plurality of existing carriers from a zone around a base station or cell/cell site at which the new carrier is to be deployed. For instance, the zone may comprise base stations that are one-hop or two-hop neighbors of the base station at which the new carrier is to be deployed with respect to inter-base station links, base stations that are within a threshold distance of the base station at which the new carrier is to be deployed with respect to inter-base station links, and so forth. In one example, the distance in terms of number of hops, geographic distance, etc. is selected such that a minimum number of existing carriers is obtainable. For instance, the distance may be incrementally increased until a minimum number of existing carriers is reached.

At step 230, the processing system obtains values of the plurality of carrier attributes and values of a configuration parameter for a plurality of existing carriers in the cellular network. For instance, the carrier attributes may be those noted above. In one example, the values of at least one of the plurality of carrier attributes for the plurality of existing carrier are scaled in accordance with a scaling function, such as noted above in connection with step 210. The configuration parameter may comprise one of: a handover margin, an inter-frequency load balancing activation status, a downlink interference generation enable status, an active mode load equalization enable status, an average uplink load biasing parameter for secondary cell selection, an inter-cell load generation for physical downlink control channel enable status, a physical downlink control channel load level parameter, an inter-frequency quality threshold for reselecting a higher priority frequency, an reference signal received power inter-frequency handover margin for handover to a neighboring base station, an inter-frequency load balancing threshold for reference signal received power target cell filtering, a hysteresis threshold for a handover margin for handover to wideband code division multiple access, a minimum transmit reference signal received power level in a cell, a reselection threshold for evaluating a lower priority frequency or a lower priority radio access technology, and so forth.

At step 240, the processing system constructs an attribute value matrix comprising the values of the plurality of carrier attributes for the plurality of existing carriers, where the attribute value matrix associates the plurality of carrier attributes to the plurality of existing carriers. For instance, the attribute value matrix may be represented by matrix X in Table 1 above.

At step 250, the processing system applies a regression to a function associating the attribute value matrix to a vector of the values of the configuration parameter for the plurality of existing carriers to learn coefficients of the function. In various examples, the regression may comprise a lasso regression, a ridge regression, a logistic regression, or the like. For instance, the regression may be applied in accordance with Equation 1 or Equation 2 above to learn "beta" coefficients. In another example, the regression may comprise a deep-learning regression (e.g., a multi-layer perceptron).

At step 260, the processing system applies the coefficients to a vector comprising the values of the plurality of carrier attributes for the new carrier to generate a value of the configuration parameter for the new carrier. For instance, when the coefficients (e.g., a column vector) are applied to the attribute values of the new carrier (e.g., a row vector), the output may be a singular value representing the recommended value of the configuration parameter.

At step 270, the processing system applies the value of the configuration parameter to the new carrier. In one example, step 270 may comprise implementing the particular value for the configuration parameter for the new carrier. In another example, step 270 may comprise transmitting an instruction to another component (such as a SON orchestrator, a cell site/base station, etc.) to implement the value of the configuration parameter for the new carrier.

Following step 270, the method 200 proceeds to step 295 where the method 200 ends.

It should be noted that the method 200 may be expanded to include additional steps or may be modified to include additional operations with respect to the steps outlined above. For instance, in one example, the method 200 may be repeated with respect to one or more additional configuration parameters for the new carrier, e.g.: obtaining values of at least a second configuration parameter for the plurality of existing carriers, applying at least a second regression to at least a second function associating the attribute value matrix to at least a second vector of the values of the at least the second configuration parameter to learn at least a second set of coefficients of the at least the second function, applying the at least the second set of coefficients to the vector comprising the values of the plurality of carrier attributes for the new carrier to generate at least a second value of the at least the second configuration parameter for the new carrier, and applying the at least the second value of the at least the second configuration parameter to the new carrier. For example, as discussed above, each set of coefficients may be learned for each different configuration parameter (e.g., different sets of beta coefficients for different $Y_{(i)}$ vectors).

In another example, the method 200 may be repeated through various cycles of new carriers being added to the cellular network at a same cell site/base station and/or at different cell sites/base stations. In one example, the method 200 may be expanded to include obtaining an accuracy feedback for the value of the configuration parameter that is applied to the new carrier. For instance, network operations personnel may inspect and confirm agreement with the value of the configuration parameter, or may change the value of the configuration parameter and disagree with the automated select in accordance with the method 200. Alternatively, or in addition, feedback may be obtained from a SON orchestrator that may adjust the value in accordance with another methodology (such as trial and error to generate incremental improvements in overall cellular network configuration). For any values that are changed, in one example, the method 200 may include relearning the coefficients through another cycle of regression in accordance with the updated values. In still another example, the method 200 may omit the regression learning of steps 230-250. For instance, these steps may comprise "offline" training that may be separately performed.

It should be noted that in one particular example, the method 200 may be combined with aspects of the method 300, discussed in greater detail below. For instance, as noted above, in one example, a collaborative filtering/regression-based learning model (e.g., per the method 200) may be used in conjunction with a nearest neighbors with tests of independence learning model (e.g., per the method 300) as primary and secondary models, respectively, or vice versa. Alternatively, or in addition, the respective nearest neighbors with tests of independence learning model (e.g., per the method 300) may be used to verify automated selections of configuration parameter values via the collaborative filtering/regression-based learning model (e.g., per the method 200). For instance, this verification may comprise additional feedback to incorporate changes to configuration parameter values for relearning coefficients. Thus, these and other modifications are all contemplated within the scope of the present disclosure.

FIG. 3 illustrates a flowchart of an example method 300 for determining and applying a particular value of a configuration parameter to a new carrier when the particular value exceeds a threshold margin of a percentage of a plurality of existing carriers having the particular value for the configuration parameter, in accordance with the present disclosure. In one example, steps, functions and/or operations of the method 300 may be performed by a component of system 100 of FIG. 1, e.g. a SON/SDN controller 190, application server 195, and so forth, or by one or more components of the system 100 in conjunction with another component, or components thereof, e.g., application server 195 in conjunction with SON/SDN controller 190, cell sites 121-124, and so forth. In one example, the steps, functions, or operations of method 300 may be performed by a computing device or system 400, and/or a processing system 402 as described in connection with FIG. 4 below. For instance, the computing device or system 400 may represent at least a portion of an application server or controller that is configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or system 400 may collectively function as a processing system. For illustrative purposes, the method 300 is described in greater detail below in connection with an example performed by a processing system. The method 300 begins in step 305 and may proceed to optional step 310 or to step 320.

At optional step 310, the processing system may determine that a plurality of carrier attributes is non-independent with respect to a carrier configuration parameter, e.g., via a chi-square test of independence, or the like.

At step 320, the processing system obtains values for a plurality of carrier attributes of a new carrier to be deployed at a base station in a cellular network. For instance, step 320 may comprise the same or similar operations as described above in connection with step 210 of the example method 200. As noted above, the plurality of carrier attributes may comprise at least one of: a base station hardware version, a base station software version, a carrier channel frequency, a carrier channel bandwidth, a base station location, a carrier type, a base station demographic characteristic, or a downlink multiple input multiple output mode. In one example, the plurality of carrier attributes includes at least two carrier attributes associated with a same nominal attribute, where the at least two carrier attributes represent a one-hot encoding of the nominal attribute.

At step 330, the processing system determines a plurality of existing carriers in the cellular network having values for the plurality of carrier attributes that are the same as the values for the plurality of carrier attributes of the new carrier, where the plurality of carrier attributes are non-independent with respect to a configuration parameter of the plurality of existing carriers. For instance, the non-independence may be determined at optional step 310 above. In one example, step 330 may include identifying the plurality of existing carriers as being deployed in a zone around the base station at which the new carrier is to be deployed. Notably, other existing carriers from within the zone that do not match on the non-independent carrier attribute may be excluded from consideration. In one example, the zone may comprise base stations that are one-hop or two-hop neighbors of the base station at which the new carrier is to be deployed with respect to inter-base station links (e.g., X2 interfaces/links). In another example, the zone may comprise base stations that are within a threshold distance of the base station at which the new carrier is to be deployed with respect to inter-base station links. In still another example, the zone may comprise a same map grid, state, or other region of the base station in which the new carrier is to be deployed, rather than a threshold distance. In one example, a size of the zone may be selected to provide a minimum number of the plurality of existing carriers having values for the plurality of carrier attributes that are the same as the values for the plurality of carrier attributes of the new carrier.

At step 340, the processing system obtains values of the configuration parameter for the plurality of existing carriers. The configuration parameter may comprise one of: a handover margin, an inter-frequency load balancing activation status, a downlink interference generation enable status, an active mode load equalization enable status, an average uplink load biasing parameter for secondary cell selection, an inter-cell load generation for physical downlink control channel enable status, a physical downlink control channel load level parameter, an inter-frequency quality threshold for reselecting a higher priority frequency, a reference signal received power inter-frequency handover margin for handover to a neighboring base station, an inter-frequency load balancing threshold for reference signal received power target cell filtering, a hysteresis threshold for a handover margin for handover to wideband code division multiple access, a minimum transmit reference signal received power level in a cell, a reselection threshold for evaluating a lower priority frequency or a lower priority radio access technology, and so forth.

At step 350, the processing system determines that a particular value of the values for the configuration parameter exceeds a threshold margin of a percentage of the plurality of existing carriers having the particular value for the configuration parameter. For instance, step 350 may comprise a majority voting and percentage thresholding, as described above.

At step 360, the processing system applies the particular value for the configuration parameter to the new carrier when the particular value is determined to exceed the threshold margin. For instance, step 360 may comprise the same or similar operations as step 270 of the example method 200.

Following step 360, the method 300 proceeds to step 395 where the method 300 ends.

It should be noted that the method 300 may be expanded to include additional steps or may be modified to include additional operations with respect to the steps outlined above. For example, the method 300 may be repeated with respect to one or more additional configuration parameters for the new carrier, e.g.: determining a second plurality of existing carriers in the cellular network having values for a second plurality of carrier attributes that are the same as values for the second plurality of carrier attributes of the new carrier, where the second plurality of carrier attributes are non-independent with respect to a second configuration parameter of the plurality of existing carriers, obtaining second values of the second configuration parameter for the second plurality of existing carrier, determining that a particular second value of the second values for the second configuration parameter exceeds a second threshold margin for a percentage of the second plurality of existing carriers having the particular second value for the second configuration parameter, and applying the particular second value for the second configuration parameter to the new carrier. For instance, in one example, different tests of independence may be applied for each configuration parameter. Thus, different existing carriers may be considered for majority voting for each configuration parameter considered for the new carrier. In this regard, it should be noted that in one example, different percentage thresholds may be utilized for accepting recommendations and/or selections for different configuration parameter values.

In another example, the method 300 may be repeated through various cycles of new carriers being added to the cellular network at a same cell site/base station and/or different cell sites/base stations. In one example, the method 300 may be expanded to update metrics of independence/non-independence of carrier attributes and configuration parameters, e.g., periodically, in response to a command from a network operator, or using any other methodology to determine when to update. In one example, as further noted above, aspects of the method 200 may be utilized in parallel to, or otherwise in conjunction with the method 300, e.g., for verification/confirmation of agreement among selected configuration parameter values, for gap filling, etc. Thus, these and other modifications are all contemplated within the scope of the present disclosure.

In addition, although not specifically specified, one or more steps, functions, or operations of the method 200 or the method 300 may include a storing, displaying, and/or outputting step as required for a particular application. In other words, any data, records, fields, and/or intermediate results discussed in the method(s) can be stored, displayed, and/or outputted either on the device executing the method or to another device, as required for a particular application. Furthermore, steps, blocks, functions or operations in FIG. 2 or FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the examples of the present disclosure.

FIG. 4 depicts a high-level block diagram of a computing device or processing system specifically programmed to perform the functions described herein. For example, any one or more components or devices illustrated in FIG. 1, or described in connection with the example method 200 and/or 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for generating and applying a value for a configuration parameter to a new carrier in a cellular network in accordance with a collaborative filtering and/or for determining and applying a particular value of a configuration parameter to a new carrier when the particular value exceeds a threshold margin of a percentage of a plurality of existing carriers having the particular value for the configuration parameter, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like). In accordance with the present disclosure input/output devices 406 may also include antenna elements, antenna arrays, remote radio heads (RRHs), baseband units (BBUs), transceivers, power units, and so forth.

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for generating and applying a value for a configuration parameter to a new carrier in a cellular network in accordance with a collaborative filtering and/or for determining and applying a particular value of a configuration parameter to a new carrier when the particular value exceeds a threshold margin of a percentage of a plurality of existing carriers having the particular value for the configuration parameter (e.g., a software program comprising computer-executable instructions) can be loaded into memory 404 and executed by hardware processor element 402 to implement the steps, functions or operations as discussed above in connection with the example method 200 and/or example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for generating and applying a value for a configuration parameter to a new carrier in a cellular network in accordance with a collaborative filtering and/or for determining and applying a particular value of a configuration parameter to a new carrier when the particular value exceeds a threshold margin of a percentage of a plurality of existing carriers having the particular value for the configuration parameter (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. An apparatus comprising:
a processing system including at least one processor; and
a computer-readable medium storing instructions which, when executed by the processing system, cause the processing system to perform operations, the operations comprising:
obtaining values of a plurality of carrier attributes for a new carrier to be deployed in a cellular network;
obtaining values of the plurality of carrier attributes and values of a configuration parameter for a plurality of existing carriers in the cellular network;
constructing an attribute value matrix comprising the values of the plurality of carrier attributes for the plurality of existing carriers, wherein the attribute value matrix associates the plurality of carrier attributes to the plurality of existing carriers;
applying a regression to a function associating the attribute value matrix to a vector of the values of the configuration parameter for the plurality of existing carriers to learn coefficients of the function;
applying the coefficients to a vector comprising the values of the plurality of carrier attributes for the new carrier to generate a value of the configuration parameter for the new carrier; and
applying the value of the configuration parameter to the new carrier.

2. The apparatus of claim 1, wherein the regression comprises one of:
a lasso regression;
a ridge regression; or
a logistic regression.

3. The apparatus of claim 1, wherein the regression comprises a multi-layer perceptron.

4. The apparatus of claim 1, wherein the plurality of carrier attributes includes at least two carrier attributes associated with a same nominal attribute, wherein the at least two carrier attributes represent a one-hot encoding of the nominal attribute.

5. The apparatus of claim 1, wherein the plurality of carrier attributes comprises at least one of:
a base station hardware version;
a base station software version;
a carrier channel frequency;
a carrier channel bandwidth;
a base station location;
a carrier type;
a base station demographic characteristic; or
a downlink multiple input multiple output mode.

6. The apparatus of claim 1, wherein the configuration parameter comprises at least one of:
a handover margin;
an inter-frequency load balancing activation status;
a downlink interference generation enable status;
an active mode load equalization enable status;
an average uplink load biasing parameter for secondary cell selection;
an inter-cell load generation for physical downlink control channel enable status;
a physical downlink control channel load level parameter;
an inter-frequency quality threshold for reselecting a higher priority frequency;
an reference signal received power inter-frequency handover margin for handover to a neighboring base station;
an inter-frequency load balancing threshold for reference signal received power target cell filtering;
a hysteresis threshold for a handover margin for handover to wideband code division multiple access;
a minimum transmit reference signal received power level in a cell; or
a reselection threshold for evaluating a lower priority frequency or a lower priority radio access technology.

7. The apparatus of claim 1, wherein the values of at least one of the plurality of carrier attributes for the plurality of existing carrier are scaled in accordance with a scaling function.

8. The apparatus of claim 1, wherein the operations further comprise:
obtaining values of at least a second configuration parameter for the plurality of existing carriers;
applying at least a second regression to at least a second function associating the attribute value matrix to at least a second vector of the values of the at least the second configuration parameter to learn at least a second set of coefficients of the at least the second function;
applying the at least the second set of coefficients to the vector comprising the values of the plurality of carrier attributes for the new carrier to generate at least a second value of the at least the second configuration parameter for the new carrier; and
applying the at least the second value of the at least the second configuration parameter to the new carrier.

9. The apparatus of claim 1, further comprising:
selecting the plurality of existing carriers from a zone around a base station at which the new carrier is to be deployed.

10. The apparatus of claim 9, wherein the zone comprises base stations that are one-hop or two-hop neighbors of the base station at which the new carrier is to be deployed with respect to inter-base station links, or wherein the zone comprise base stations that are within a threshold distance of the base station at which the new carrier is to be deployed with respect to inter-base station links.

11. A non-transitory computer-readable medium storing instructions which, when executed by a processing system including at least one processor, cause the processing system to perform operations, the operations comprising:
obtaining values of a plurality of carrier attributes for a new carrier to be deployed in a cellular network;
obtaining values of the plurality of carrier attributes and values of a configuration parameter for a plurality of existing carriers in the cellular network;
constructing an attribute value matrix comprising the values of the plurality of carrier attributes for the plurality of existing carriers, wherein the attribute value matrix associates the plurality of carrier attributes to the plurality of existing carriers;
applying a regression to a function associating the attribute value matrix to a vector of the values of the configuration parameter for the plurality of existing carriers to learn coefficients of the function;
applying the coefficients to a vector comprising the values of the plurality of carrier attributes for the new carrier to generate a value of the configuration parameter for the new carrier; and
applying the value of the configuration parameter to the new carrier.

12. An apparatus comprising:
a processing system including at least one processor; and
a computer-readable medium storing instructions which, when executed by the processing system, cause the processing system to perform operations, the operations comprising:
  obtaining values for a plurality of carrier attributes of a new carrier to be deployed at a base station in a cellular network;
  determining a plurality of existing carriers in the cellular network having values for the plurality of carrier attributes that are the same as the values for the plurality of carrier attributes of the new carrier, wherein the plurality of carrier attributes is non-independent with respect to a configuration parameter of the plurality of existing carriers;
  obtaining values of the configuration parameter for the plurality of existing carriers;
  determining that a particular value of the values for the configuration parameter exceeds a threshold margin of a percentage of the plurality of existing carriers having the particular value for the configuration parameter; and
  applying the particular value for a configuration parameter to the new carrier when the particular value is determined to exceed the threshold margin.

13. The apparatus of claim 12, wherein the operations further comprise:
  determining that the plurality of carrier attributes is non-independent with respect to the configuration parameter via a chi-square test of independence.

14. The apparatus of claim 12, wherein the determining the plurality of existing carriers comprises identifying the plurality of existing carriers as being deployed in a zone around the base station at which the new carrier is to be deployed.

15. The apparatus of claim 14, wherein the zone comprise base stations that are one-hop or two-hop neighbors of the base station at which the new carrier is to be deployed with respect to inter-base station links.

16. The apparatus of claim 14, wherein the zone comprises base stations that are within a threshold distance of the base station at which the new carrier is to be deployed with respect to inter-base station links.

17. The apparatus of claim 14, wherein a size of the zone is selected to provide a minimum number of the plurality of existing carriers having values for the plurality of carrier attributes that are the same as the values for the plurality of carrier attributes of the new carrier.

18. The apparatus of claim 12, wherein the plurality of carrier attributes comprises at least one of:
  a base station hardware version;
  a base station software version;
  a carrier channel frequency;
  a carrier channel bandwidth;
  a base station location;
  a carrier type;
  a base station demographic characteristic; or
  a downlink multiple input multiple output mode.

19. The apparatus of claim 12, wherein the configuration parameter comprises at least one of:
  a handover margin;
  an inter-frequency load balancing activation status;
  a downlink interference generation enable status;
  an active mode load equalization enable status;
  an average uplink load biasing parameter for secondary cell selection;
  an inter-cell load generation for physical downlink control channel enable status;
  a physical downlink control channel load level parameter;
  an inter-frequency quality threshold for reselecting a higher priority frequency;
  an reference signal received power inter-frequency handover margin for handover to a neighboring base station;
  an inter-frequency load balancing threshold for reference signal received power target cell filtering;
  a hysteresis threshold for a handover margin for handover to wideband code division multiple access;
  a minimum transmit reference signal received power level in a cell; or
  a reselection threshold for evaluating a lower priority frequency or a lower priority radio access technology.

20. The apparatus of claim 12, wherein the operations further comprise:
  determining a second plurality of existing carriers in the cellular network having values for a second plurality of carrier attributes that are the same as values for the second plurality of carrier attributes of the new carrier, wherein the second plurality of carrier attributes is non-independent with respect to a second configuration parameter of the plurality of existing carriers;
  obtaining second values of the second configuration parameter for the second plurality of existing carrier;
  determining that a particular second value of the second values for the second configuration parameter exceeds a second threshold margin for a percentage of the second plurality of existing carriers having the particular second value for the second configuration parameter; and
  applying the particular second value for the second configuration parameter to the new carrier.

* * * * *